United States Patent
Park

(10) Patent No.: US 12,205,472 B2
(45) Date of Patent: Jan. 21, 2025

(54) ELECTRONIC DEVICE FOR VEHICLE AND METHOD FOR OPERATING THE SAME

(71) Applicant: LG Electronics Inc., Seoul (KR)

(72) Inventor: Suho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1056 days.

(21) Appl. No.: 16/988,220

(22) Filed: Aug. 7, 2020

(65) Prior Publication Data

US 2021/0043090 A1    Feb. 11, 2021

(30) Foreign Application Priority Data

Aug. 9, 2019 (KR) .......................... 10-2019-0097783

(51) Int. Cl.
| | |
|---|---|
| G08G 1/00 | (2006.01) |
| H04W 4/46 | (2018.01) |
| H04W 36/00 | (2009.01) |
| H04W 36/32 | (2009.01) |

(52) U.S. Cl.
CPC ............... *G08G 1/22* (2013.01); *H04W 4/46* (2018.02); *H04W 36/0009* (2018.08); *H04W 36/322* (2023.05)

(58) Field of Classification Search
CPC ...... G08G 1/22; H04W 4/46; H04W 36/0009; H04W 36/08; H04W 36/32; H04W 36/36
See application file for complete search history.

(56) References Cited

U.S. PATENT DOCUMENTS

| | | | | |
|---|---|---|---|---|
| 2010/0256852 A1* | 10/2010 | Mudalige | ................. | G08G 1/22 701/24 |
| 2015/0199905 A1* | 7/2015 | Hayee | .............. | G08G 1/096716 701/118 |
| 2019/0079540 A1* | 3/2019 | Yoon | ....................... | H04W 4/40 |

(Continued)

FOREIGN PATENT DOCUMENTS

| | | | |
|---|---|---|---|
| JP | 5516070 A | 6/2014 | |
| JP | 6520693 A | 5/2019 | |

(Continued)

OTHER PUBLICATIONS

Office Action in Korean Appln. No. 10-2019-0097783, mailed on Nov. 12, 2024, 14 pages (with English translation).

*Primary Examiner* — Adam R Mott
*Assistant Examiner* — Ricardo I Viscarra
(74) *Attorney, Agent, or Firm* — Fish & Richardson P.C.

(57) ABSTRACT

Disclosed are a vehicular electronic device and an operation method thereof. The device includes a processor configured to acquire data of a situation of a vehicle, to determine whether the vehicle is a platooning vehicle based on the data, and to determine any one of vehicles in the group as a representative vehicle that transmits a basic safety message (BSM) as a representative of the group upon determining that the vehicle is the platooning vehicle. Data generated by the vehicular electronic device is transmitted to an external device using a 5G communication method. According to the present disclosure, an electronic device of an autonomous vehicle is associated or fuses with a device related to an artificial intelligence module, an unmanned aerial vehicle (UAV), a robot, an augmented reality (AR) device, a virtual reality (VR) device, a 5G service, or the like.

5 Claims, 15 Drawing Sheets

(56) References Cited

U.S. PATENT DOCUMENTS

| | | | |
|---|---|---|---|
| 2019/0120964 A1* | 4/2019 | Luo | G01S 7/4817 |
| 2019/0174286 A1* | 6/2019 | Guo | H04W 72/02 |
| 2019/0236959 A1* | 8/2019 | Belapurkar | G08G 1/22 |
| 2020/0314952 A1* | 10/2020 | Jornod | G08G 1/22 |

FOREIGN PATENT DOCUMENTS

| | | |
|---|---|---|
| KR | 10-2016-0065548 A | 6/2016 |
| KR | 10-2019-0030091 A | 3/2019 |

* cited by examiner

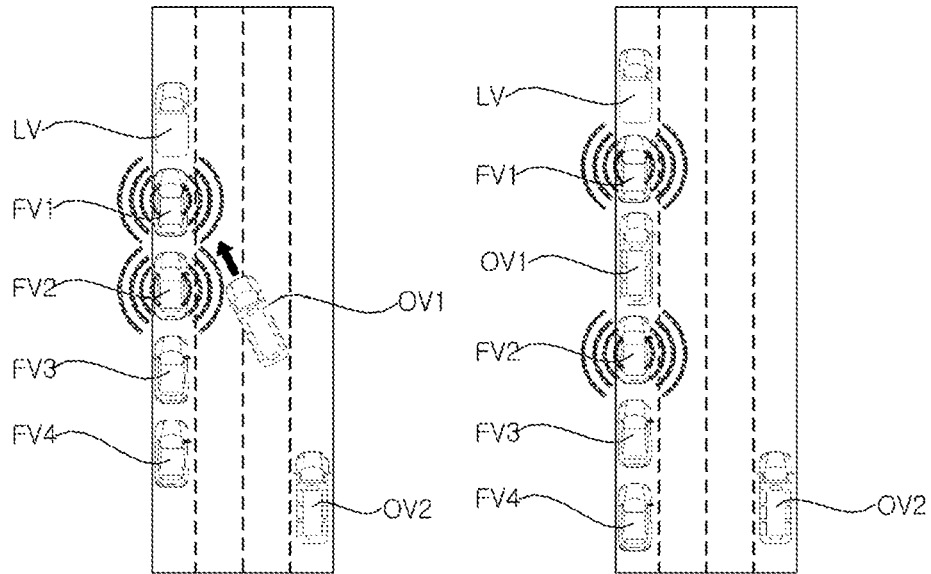
FIG. 14A        FIG. 14B
FIG 15
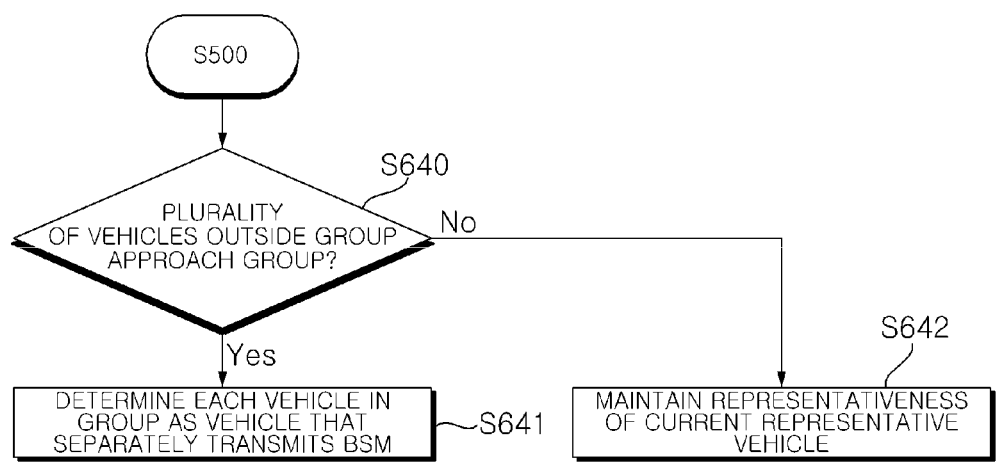

ELECTRONIC DEVICE FOR VEHICLE AND METHOD FOR OPERATING THE SAME

CROSS REFERENCE TO RELATED APPLICATIONS

This application claims the priority benefit of Korean Patent Application No. 10-2019-0097783, filed on Aug. 9, 2019, the disclosure of which is incorporated herein by reference.

BACKGROUND OF THE DISCLOSURE

Field of the Disclosure

The present disclosure relates to an electronic device for a vehicle and a method for operating the same, and more particularly, to an electronic device for a vehicle and a method for operating the same for transmitting a basic safety message (BSM) by any one of a plurality of vehicles as a representative of a group when the plurality of vehicles forms the group and perform platooning.

Description of the Related Art

A vehicle is an apparatus that is moved in a desired direction by a user who rides therein. A representative example of a vehicle is an automobile. An autonomous vehicle is a vehicle that autonomously travels without driving manipulation of a human.

A plurality of autonomous vehicles may form a group and may perform platooning. In this case, one group may include a leader vehicle that provides a control signal and one or more follower vehicles controlled according to the control signal.

During platooning, communication of a large amount of information (e.g., communication of information on the number of vehicles in the group, an interval between vehicles, and positions or speed of the vehicles) is supposed to be performed inside and outside the group, and thus there has been a need to develop technology for effectively use a computing resource of an on board unit (OBU) and/or a communication resource.

That is, in a situation in which the above communication of a large amount of information is supposed to be performed, there is a problem in that it is not efficient in terms of use of a resource to separately transmit a basic safety message (BSM) to a nearby vehicle (or other objects adjacent to the group) by all vehicles in the group.

US 2017/0289864 discloses a configuration of reducing overhead of an access network by making a request for handover by a leader vehicle of a group instead of a follower vehicle.

However, in the above US 2017/0289864, a leader vehicle is set as a vehicle that makes a request for handover of a vehicle in a group without consideration of a state of a use of a computing resource and/or a communication resource of each vehicle in the group, and thus there is a problem in that the computing resource and/or the communication resource of the vehicle in the group are not effectively used.

That is, conventional technology as well as the above U.S. Patent Publication does not propose a method of transmitting a basic safety message (BSM) by at least one vehicle as a representative vehicle of the group, which is determined based on a state of use of a computing resource and/or a communication resource, to improve the efficiency and safety of a platooning system.

SUMMARY

It is a first object of the present disclosure to provide a vehicular electronic device and an operation method thereof for transmitting a basic safety message (BSM) during platooning in terms of effective usage of a computing resource and/or a communication resource.

It is a second object of the present disclosure to provide a vehicular electronic device and an operation method thereof for organically changing a subject that transmits a BSM in response to a current situation during platooning.

The technical problems solved by the embodiments are not limited to the above technical problems, and other technical problems which are not described herein will become apparent to those skilled in the art from the following description.

In accordance with an aspect of the present disclosure, the above and other objects can be accomplished by the provision of a vehicular electronic device including a processor configured to acquire data of a situation of a vehicle, to determine whether the vehicle is a platooning vehicle based on the data, and to determine any one of vehicles in the group as a representative vehicle that transmits a basic safety message (BSM) as a representative of the group upon determining that the vehicle is the platooning vehicle.

The processor may determine a vehicle that uses a smallest amount of a communication resource among vehicles in the group as the representative vehicle, based on information on a state of use of the communication resource of each vehicle in the group, which is received via vehicle to vehicle communication (V2V) communication. Thus, the BSM may be transmitted during platooning in terms of effective use of a communication resource.

Upon determining that the usage amount of the communication resource of a current representative vehicle determined as the representative vehicle among the vehicles in the group increases to the reference value or greater, the processor may re-determine a vehicle having a smallest usage amount of the communication resource as the representative vehicle except for the current representative vehicle among the vehicles in the group. Thus, a subject that transmits a BSM may be organically changed during platooning.

In accordance with another aspect of the present disclosure, the above and other objects can be accomplished by the provision of a operation method of a vehicular electronic device, including acquiring data of a situation of a vehicle, by at least one processor, determining whether the vehicle is a platooning vehicle based on the data, by the at least one processor, and determining any one of vehicles in the group as a representative vehicle that transmits a basic safety message (BSM) as a representative of the group upon determining that the vehicle is the platooning vehicle, by the at least one processor.

Technical solutions that are not stated above may be sufficiently described from the description of embodiments of the present disclosure.

BRIEF DESCRIPTION OF THE DRAWINGS

FIGS. 13 to 14B are detailed diagrams of operation S600 of changing the representativeness of a representative vehicle according to an embodiment and illustrate separate transmission of a BSM in a group when a vehicle outside the group enter the group or attempts to enter the group.

FIGS. 15 and 16 are detailed diagrams of operation S600 of changing the representativeness of a representative vehicle according to an embodiment and illustrate separate transmission of a BSM of a vehicle in a group when a plurality of vehicles in the group approaches the group.

DETAILED DESCRIPTION

Reference will now be made in detail to the exemplary embodiments of the present disclosure, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in the present disclosure.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

Figure 1:
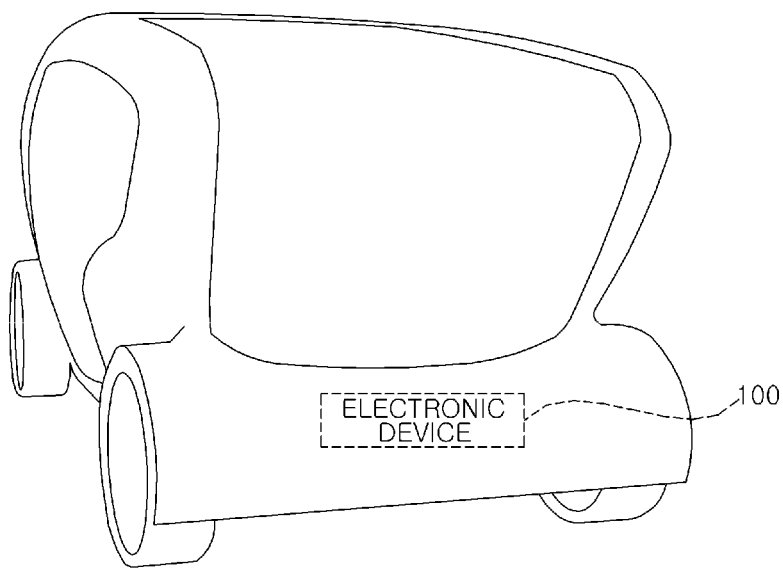
FIG. 1 is a diagram showing an outer appearance of a vehicle according to an embodiment.
Figure 1:
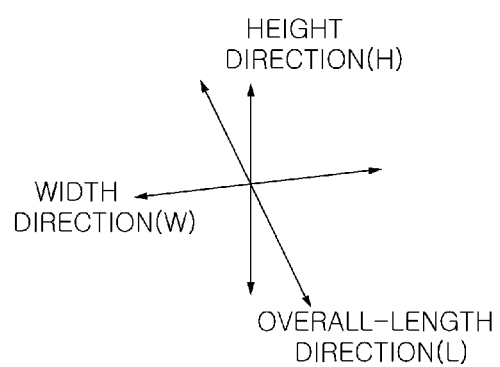

FIG. 1 is a diagram showing an outer appearance of a vehicle according to an embodiment.

Referring to FIG. 1, a vehicle 10 according to an embodiment may be defined as a transportation device that travels on a road or a railroad. The vehicle 10 may conceptually include an automobile, a train, and a motorcycle. The vehicle 10 may include a vehicle equipped with an internal combustion engine as a power source, a hybrid vehicle equipped with both an engine and an electric motor as a power source, and an electric vehicle equipped with an electric motor as a power source. The vehicle 10 may be a sharing vehicle. The vehicle 10 may be an autonomous vehicle.

The vehicle 10 may include an electronic device 100. The electronic device 100 may be a device that determines whether the vehicle 10 is a platooning vehicle and transmits a basic safety message (BSM) when the vehicle 10 is a platooning vehicle. The vehicle 10 may transmit the BSM to a nearby vehicle (or other vehicles adjacent to a group) based on a BSM transmission control signal determined by the electronic device 100.

The vehicle 10 may interact with at least one robot. The robot may be an autonomous mobile robot (AMR) that autonomously travels. The AMR is autonomously moveable and freely moves, and includes a plurality of sensors for avoiding an obstacle or the like while traveling. The AMR may be a flight type robot (e.g., a drone) including a flight device. The AMR may be a wheel type robot that includes at least one wheel and moves via rotation of the wheel. The AMR may be a leg type robot that includes at least one leg and moves using the leg.

A robot may function as a device for providing convenience of a user of the vehicle 10. For example, the robot may move a load on the vehicle 10 to a final destination of a user. For example, the robot may guide a road to a final destination to the user who exits from the vehicle 10. For example, the robot may transfer a user who exits from the vehicle 10 to a final destination.

At least one electronic device included in a vehicle may communicate with a robot through a communication device 220.

At least one electronic device included in a vehicle may provide, to the robot, data processed by at least one electronic device included in the vehicle. For example, the at least one electronic device included in the vehicle may provide, to the robot, at least one of object data, HD map data, vehicle state data, vehicle position data, or driving plan data.

The at least one electronic device included in the vehicle may receive data processed by the robot, from the robot. The at least one electronic device included in the vehicle may receive at least one of sensing data generated by the robot, object data, robot state data, robot position data, or robot moving plan data.

The at least one electronic device included in the vehicle may generate a control signal in further consideration of the data received from the robot. For example, the at least one electronic device included in the vehicle may compare information on an object generated by an object detection device 210 with information on an object generated by a robot and may generate a control signal based on the comparison result.

The at least one electronic device included in the vehicle may generate a control signal to prevent interference between a moving route of the vehicle 10 and a moving route of the robot.

The at least one electronic device included in the vehicle may include a software module or a hardware module (hereinafter, an AI module) which implements artificial intelligence (AI).

The at least one electronic device included in the vehicle may input the acquired data to the AI module and may use data output from the AI module.

The AI module may perform machine learning on input data using at least one artificial neural network (ANN). The AI module may output the driving plan data by performing machine learning on the input data.

The at least one electronic device included in the vehicle may generate a control signal based on the data output from the AI module.

In some embodiments, the at least one electronic device included in the vehicle may receive data processed by AI from an external device through the communication device 220. The at least one electronic device included in the vehicle may generate a control signal based on the data processed by AI.

Figure 2:
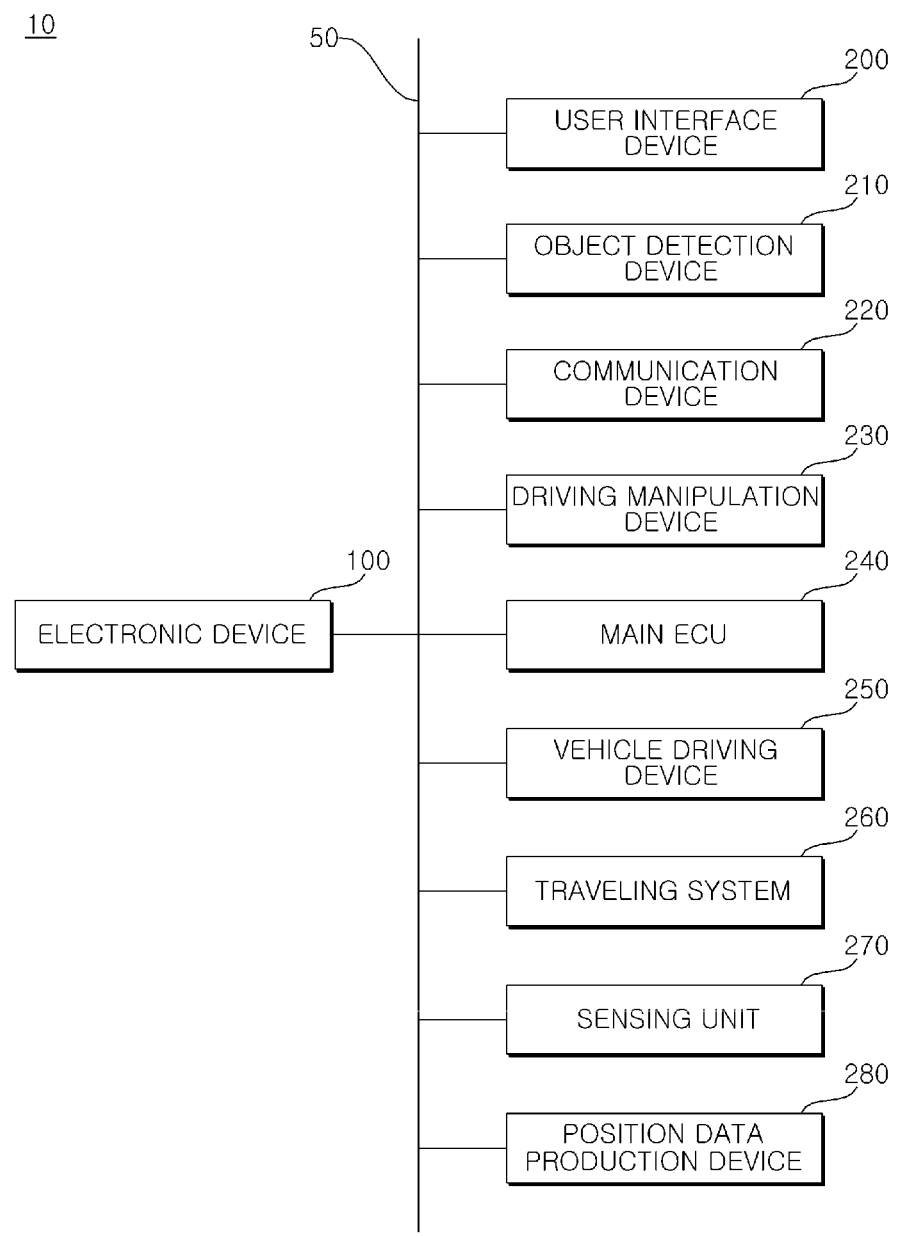
FIG. 2 is a control block diagram of a vehicle according to an embodiment.

FIG. 2 is a control block diagram of a vehicle according to an embodiment.

Referring to FIG. 2, the vehicle 10 may include the vehicular electronic device 100, a user interface device 200, an object detection device 210, a communication device 220, a driving manipulation device 230, a main electronic control unit (ECU) 240, a vehicle driving device 250, a traveling system 260, a sensing unit 270, and a position data production device 280.

The electronic device 100 may detect an object through the object detection device 210. The electronic device 100 may exchange data with a nearby vehicle using the communication device 220. The electronic device 100 may generate a signal for controlling movement of the vehicle 10 or outputting information to a user based on the data of the object, received using the traveling system 260. In this case, a microphone, a speaker, or a display included in the vehicle 10 may be used. The electronic device 100 may control safe traveling through the vehicle driving device 250.

The UI device 200 may be used to enable the vehicle 10 to communicate with a user. The UI device 200 may receive user input, and may provide information generated by the vehicle 10 to the user. The vehicle 10 may implement a UI or User Experience (UX) through the UI device 200.

The UI device 200 may include an input unit an output unit.

The input unit may be used to receive information from a user, and data collected by the input unit may be processed according to a control command of the user. The input unit may include a voice input unit, a gesture input unit, a touch input unit, and a mechanical input unit. The output unit may be used to generate output related to a visual output, an acoustic output, or a haptic output. The output unit may include at least one of a display, an audio output unit, or a haptic output unit.

The display may display graphic objects corresponding to various kinds of information. The display may include at least one of a liquid crystal display (LCD), a thin film transistor-liquid crystal display (TFT LCD), an organic light-emitting diode (OLED) display, a flexible display, a 3D display, or an e-ink display.

The display may form a layered structure together with the touch input unit or be integrated with the touch input unit, thereby implementing a touchscreen. The display may be implemented as a head up display (HUD). In this case, the may include a projection module and may output information through an image projected onto a windshield or a window. The display may include a transparent display. The transparent display may be attached to the windshield or a window.

The display may be disposed in an area of the steering wheel, an area of the instrument panel, an area of a seat, an area of a pillar, an area of a door, an area of the center console, an area of a head lining, or an area of a sun visor, or may be implemented in an area of the windshield, and an area of a window.

The user interface device 200 may include a plurality of displays.

The audio output unit may convert an electrical signal received from the processor 170 to an audio signal, and outputs the audio signal. To this end, the audio output unit 252 may include one or more speakers.

The haptic output unit may generate a haptic output. For example, the haptic output unit may vibrate the steering wheel, a seat belt, or a seat in such a way that a user may perceive the output.

The UI device 200 may be referred to as a vehicular display device.

The object detection device 210 may include at least one sensor for detecting an object outside the vehicle 10. The object detection device 210 may include at least one of a camera, radio detecting and ranging (radar), light detection and ranging (LiDAR), an ultrasonic sensor, or an infrared sensor. The object detection device 210 may provide data of an object, which is generated based on a sensing signal generated by a sensor, to at least one electronic device included in a vehicle.

The object may be various objects related to driving of the vehicle 10. For example, the object may include a lane, other vehicles, a pedestrian, a two-wheeled vehicle, a traffic signal, a construction, a speed bump, a geographical feature, an animal, or the like.

The object may be classified into a mobile object and a fixed object. For example, the mobile object may conceptually include other vehicles or a pedestrian and the fixed object may conceptually include a traffic signal, a road, or a construction.

The camera may generate information on an object outside the vehicle 10 using an image. The camera may include at least one lens, at least one image sensor, and at least one processor that is electrically connected to the image sensor to process a received signal and generates data of an object based on the processed signal.

The camera may be at least one of a mono camera, a stereo camera, or an around view monitoring (AVM) camera. The camera may acquire information about the location of an object, information about a distance to the object, or information about a relative speed with respect to the object by any of various image processing algorithms. For example, the camera may acquire information about a distance to an object and information about a relative speed with respect to the object in an acquired image, based on a variation in the size of the object over time.

For example, the camera may acquire information about a distance to an object and information about a relative speed with respect to the object through a pin hole model, road surface profiling, or the like.

For example, the camera may acquire information about a distance to an object and information about a relative speed with respect to the object based on disparity information in a stereo image acquired by a stereo camera.

The RADAR may generate information an object outside the vehicle 10 using an electromagnetic wave. The RADAR may include an electromagnetic wave transmitter, an electromagnetic wave receiver, and at least one processor that is electrically connected to the electromagnetic wave transmitter and the electromagnetic wave receiver, is configured to a received signal, and to generate data of an object based on the processed signal.

The RADAR may be implemented by pulse RADAR or continuous wave RADAR according to a radio wave emission principle. The RADAR may be implemented by Frequency Modulated Continuous Wave (FMCW) or Frequency Shift Keying (FSK) according to a signal waveform among the continuous wave radar methods. The RADAR may detect an object in a time of flight (TOF) or phase shifting by electromagnetic waves, and may detect the location, distance, and relative speed of the detected object.

The LiDAR may generate information on an object outside the vehicle 10 using a laser beam. The LiDAR may include an optical transmitter, an optical receiver, and at least one processor that is electrically connected to the optical transmitter and the optical receiver to process a received signal and generates data of an object based on the processed signal.

The LiDAR may be implemented using a time of flight (TOF) method or a phase-shift method. The LiDAR may be implemented in a driven or non-driven manner. If the LiDAR is implemented in the driven manner, the LiDAR may be rotated by a motor and detect an object around the vehicle. If the LiDAR is implemented in a non-driven manner, the LiDAR may detect an object within a predetermined range from the vehicle by optical steering.

The vehicle 10 may include a plurality of non-driven LiDARs. The LiDAR may detect an object in TOF or phase shifting by laser light, and determine the location, distance, and relative speed of the detected object.

The communication device 220 may exchange a signal with a device positioned outside the vehicle 10. The communication device 220 may exchange a signal with at least one of an infrastructure element (e.g., a server or a broadcasting station) or other vehicles. The communication device 220 may include at least one of a transmission antenna, a reception antenna, a radio frequency (RF) circuit for implementing various communication protocols, or an RF device for performing communication.

The communication device 220 may include a short-range communication unit, a location information unit, a vehicle-to-everything (V2X) communication unit, an optical communication unit, a broadcasting transceiver unit, and an intelligent transport system (ITS) communication unit.

The V2X communication unit is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit may include an RF circuit capable of implementing a V2I protocol, a V2V protocol, and a V2P protocol.

The communication device 220 may implement a vehicular display device along with the UI device 200. In this case, the vehicular display device may be referred to as a telematics device or an Audio Video Navigation (AVN) device.

The communication device 220 may communicate with a device positioned outside the vehicle 10 using a 5G (e.g., new radio (NR)) communication system. The communication device 220 may implement V2X (V2V, V2D, V2P, and V2N) communication using a 5G method.

Figure 4A:
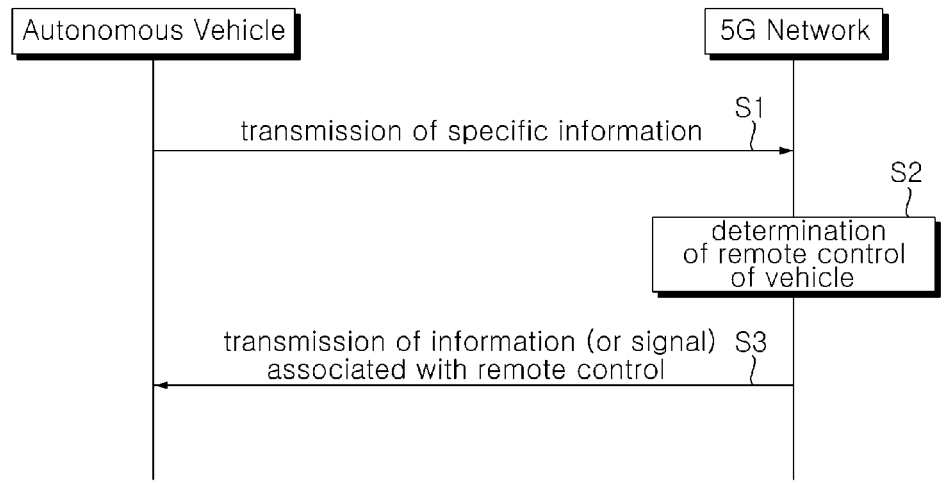
FIGS. 4A and 4B show an example of a basic operation and an application operation of an autonomous vehicle and a 5G network in a 5G communication system.
Figure 4B:
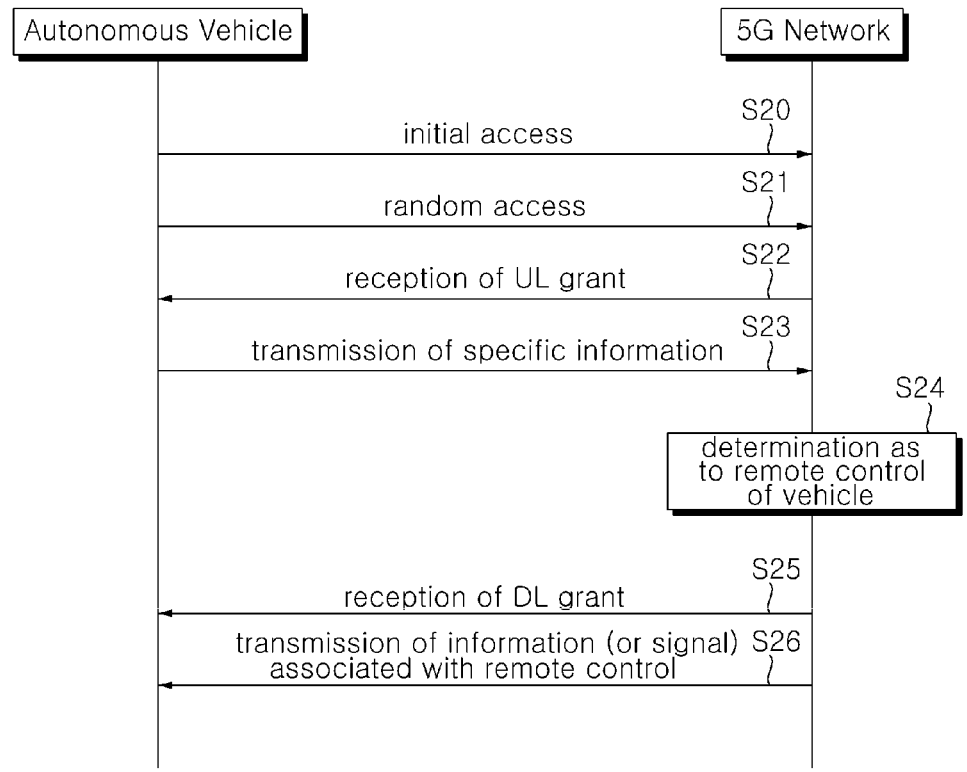

FIGS. 4A and 4B show an example of a basic operation and an application operation of an autonomous vehicle and a 5G network in a 5G communication system.

FIG. 4A shows an example of the basic operation of the autonomous vehicle and the 5G network in the 5G communication system.

The autonomous vehicle may transmit specific information to the 5G network (S1).

The specific information may include autonomous driving related information.

The autonomous driving related information may be information that is directly related to control of traveling of a vehicle. For example, the autonomous driving related information may include one or more of object data indicating an object around a vehicle, map data, vehicle state data, vehicle position data, and driving plan data.

The autonomous driving related information may further include service information required for autonomous driving or the like. For example, the specific information may include information on a destination input through a user terminal and safety rating of a vehicle. The 5G network may determine whether the vehicle is remotely controlled (S2).

Here, the 5G network may include a server or a module that performs remote control related to autonomous driving.

The 5G network may transmit information (or signal) related to remote control to the autonomous vehicle (S3).

As described above, the information related to the remote control may be a signal that is directly applied to an autonomous vehicle and may further include service information required for autonomous driving. According to an embodiment, the autonomous vehicle may receive service information such as information on insurance for each section selected from a travel route and information on a danger zone through a server connected to the 5G network, and thus may provide a service related to autonomous driving.

FIG. 4B shows an example of the application operation of the autonomous vehicle and the 5G network in the 5G communication system.

The autonomous vehicle may perform an initial access procedure on the 5G network (S20).

The initial access procedure may include cell search for acquisition of a downlink (DL) operation, a procedure of acquisition of system information, and the like.

The autonomous vehicle may perform a random access procedure on the 5G network (S21).

The random access procedure may include a preamble transmission procedure, a random access response reception procedure, and the like in order to acquire synchronization of uplink (UL) or to transmit UL data, which will be described in detail in paragraph G.

The 5G network may transmit UL grant for scheduling transmission of specific information to the autonomous vehicle (S22).

Reception of the UL grant may include a procedure of receiving of scheduling of a time/frequency resource in order to transmit the UL data to the 5G network.

The autonomous vehicle may transmit the specific information to the 5G network based on the UL grant (S23). The 5G network may determine whether the vehicle is remotely controlled (S24).

The autonomous vehicle may receive DL grant through a physical DL control channel in order to receive response to the specific information from the 5G network (S25).

The 5G network may transmit information (or signal) associated to remote control to the autonomous vehicle based on the DL grant (S26).

The driving manipulation device 230 may be used to receive a user command for driving the vehicle 10. In the manual mode, the vehicle 10 may travel based on a signal provided by the driving manipulation device 230. The driving manipulation device 230 may include a steering input device (e.g., a steering wheel), an acceleration input device (e.g., an acceleration pedal), and a brake input device (e.g., a brake pedal).

The main ECU 240 may control an overall operation of at least one electronic device included inside the vehicle 10.

The vehicle driving device 250 may be a device that electrically controls various vehicle driving devices in the vehicle 10. The vehicle driving device 250 may include a power train driving control device, a chassis driving control device, a door/window driving control device, a safety device driving control device, a lamp driving control device, and an air conditioner driving control device. The power train driving control device may include a power source driving control device and a transmission driving control device. The chassis driving control device may include a steering driving control device, a brake driving control device, and a suspension driving control device.

The safety device driving control device may include a safety belt driving control device for control of safety belt.

The vehicle driving device 250 may also be referred to as a control electronic control unit (ECU).

A traveling system 260 may generate a signal for controlling the movement of the vehicle 10 or for outputting information to a user, based on the data of the object, which is received from the object detection device 210. The traveling system 260 may provide the generated signal to at least one of the user interface device 200, the main ECU 240, or the vehicle driving device 250.

The traveling system 260 may conceptually include an advanced driver assistance system (ADAS). The ADAS 260 may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, a high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system.

The traveling system 260 may include autonomous driving electronic control unit (ECU). The autonomous driving ECU may set an autonomous driving route based on data received from at least one of other electronic devices in the vehicle 10. The autonomous driving ECU may set an autonomous driving route based on data received from at least one of the user interface device 200, the object detection device 210, the communication device 220, the sensing unit 270, or the position data production device 280. The autonomous driving ECU may generate a control signal to enable the vehicle 10 to travel along an autonomous driving route. The autonomous driving ECU may generate a control signal to enable a plurality of vehicles to form a group together and to perform platooning. The control signal generated by the autonomous driving ECU may be provided to at least one of the main ECU 240 or the vehicle driving device 250.

The sensing unit 270 may sense a vehicle state. The sensing unit 270 may include at least one of an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tire sensor, a steering sensor for rotation of the steering wheel, an in-vehicle temperature sensor, an in-vehicle humidity sensor, an ultrasonic sensor, an illuminance sensor, an acceleration pedal position sensor, or a brake pedal position sensor. The inertial navigation unit (IMU) sensor may include one or more of an acceleration sensor, a gyro sensor, and a magnetic sensor.

The sensing unit 270 may generate state data of a vehicle based on a signal generated by at least one sensor. The sensing unit 270 may acquire a sensing signal of vehicle position information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, the pressure applied to an accelerator pedal, the pressure applied to a brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The sensing unit may include a tension sensor. The tension sensor may generate a sensing signal based on a tension state of a safety belt.

The position data production device 280 may generate position data of the vehicle 10. The position data production device 280 may include at least one of a global positioning system (GPS) or a differential global positioning system (DGPS). The position data production device 280 may generate position data of the vehicle 10 based on a signal generated by at least one of a GPS or a DGPS. In some embodiments, the position data production device 280 may correct the position data based on at least one of an inertial measurement unit (IMU) of the sensing unit 270 or a camera of the object detection device 210.

The position data production device 280 may be referred to as a position displacement device. The position data production device 280 may be referred to as a global navigation satellite system (GNSS).

The vehicle 10 may include an internal communication system 50. A plurality of electronic devices included in the vehicle 10 may exchange signals using the internal communication system 50 as a medium. The signals may include data. The internal communication system 50 may use at least one communication protocol (e.g., CAN, LIN, FlexRay, MOST, or Ethernet).

Figure 3:
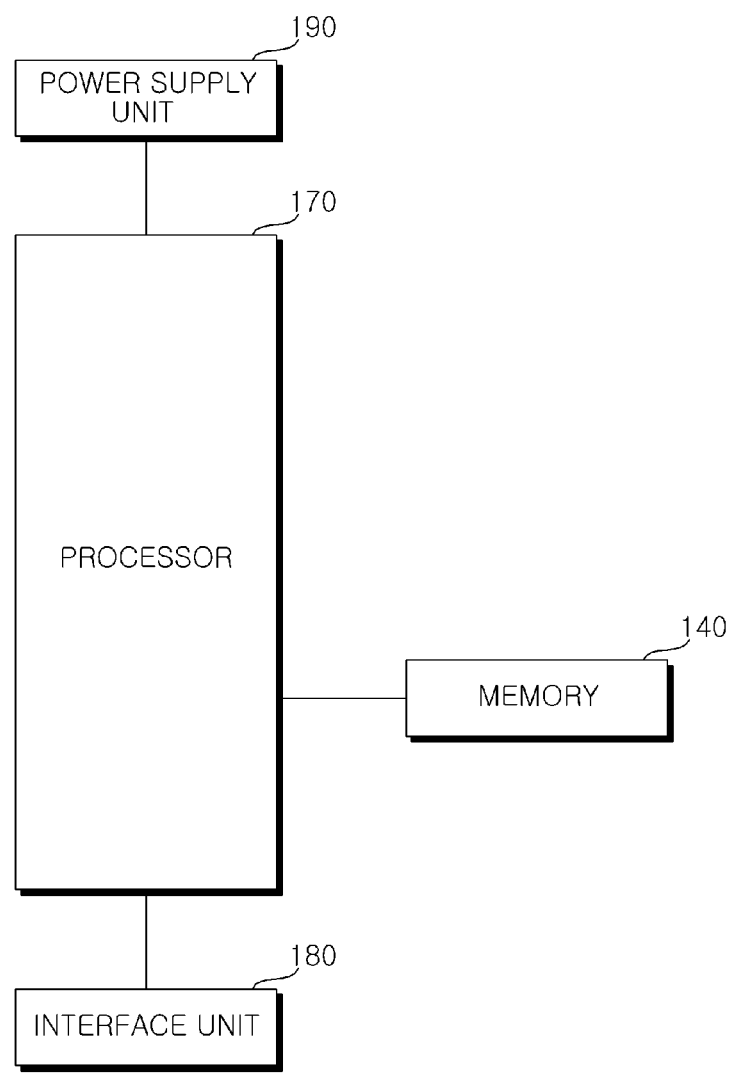
FIG. 3 is a control block diagram of an electronic device according to an embodiment.

FIG. 3 is a control block diagram of an electronic device according to an embodiment.

Referring to FIG. 3, the electronic device 100 may include a memory 140, a processor 170, an interface unit 180, and a power supply unit 190.

The memory 140 may be electrically connected to the processor 170. The memory 140 may store basic data of a predetermined unit, control data for control of an operation of a predetermined unit, and input and output data. The memory 140 may store data processed by the processor 170. The memory 140 may include at least one of a read-only memory (ROM), random-access memory (RAM), erasable programmable read only memory (EPROM), flash drive, or hard drive in terms of hardware. The memory 140 may store various data for an overall operation of the vehicular firewall providing device 100, such as a program for processing or controlling the processor 170. The memory 140 may be integrated into the processor 170. In some embodiments, the memory 140 may be classified as a lower-ranking component of the processor 170.

The interface unit 180 may exchange signals with the at least one electronic device included in the vehicle 10 in a wired or wireless manner. The interface unit 180 may exchange signals with at least one of the object detection device 210, the communication device 220, the driving manipulation device 230, the main ECU 240, the vehicle driving device 250, the ADAS 260, the sensing unit 270, or the position data production device 280 in a wired or wireless manner. The interface unit 180 may configure at least one of a communication module, a terminal, a pin, a cable, a port, a circuit, an element, or a device.

The interface unit 180 may receive travel environment information on a travel road. The interface unit 180 may receive position data of the vehicle 10 from the position data production device 280. The interface unit 180 may receive travel speed data from the sensing unit 270. The interface unit 180 may receive data of an object around the vehicle from the object detection device 210.

The power supply unit 190 may supply power to the electronic device 100. The power supply unit 190 may receive power from a power source (e.g., a battery) included in the vehicle 10 and may supply power to each unit of the electronic device 100. The power supply unit 190 may be operated according to a control signal provided from the main ECU 240. The power supply unit 190 may be embodied as a switched-mode power supply unit (SMPS).

The processor 170 may be electrically connected to the memory 140, the interface unit 180, and the power supply unit 190 and may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing other functions.

The processor 170 may be driven by power supplied from the power supply unit 190. The processor 170 may receive data, may process the data, may generate a signal, and may provide a signal in a state in which power is supplied by the power supply unit 190.

The processor 170 may receive information from other electronic devices within the vehicle 10 through the interface unit 180. The processor 170 may receive platooning information of the vehicle 10 from the traveling system 260 through the interface unit 180. The processor 170 may receive travel environment information on a travel road from the object detection device 210 and the position data production device 280 through the interface unit 180. The processor 170 may provide a control signal to other electronic devices in the vehicle 10 through the interface unit 180.

The travel environment information may include object information including the type, number, and height of an object positioned on a traveling direction acquired by the object detection device 210, and global positioning system (GPS) information acquired by the position data production device 280. The travel environment information may include information on a road on which a vehicle currently travels and information on a nearby obstacle.

The processor 170 may receive user input through a user interface device. For example, the processor 170 may receive at least one of voice input, gesture input, touch input, or mechanical input through the user interface device 200.

The electronic device 100 may include at least one printed circuit board (PCB). The memory 140, the interface unit 180, the power supply unit 190, and the processor 170 may be electrically connected to the PCB.

Figure 5:
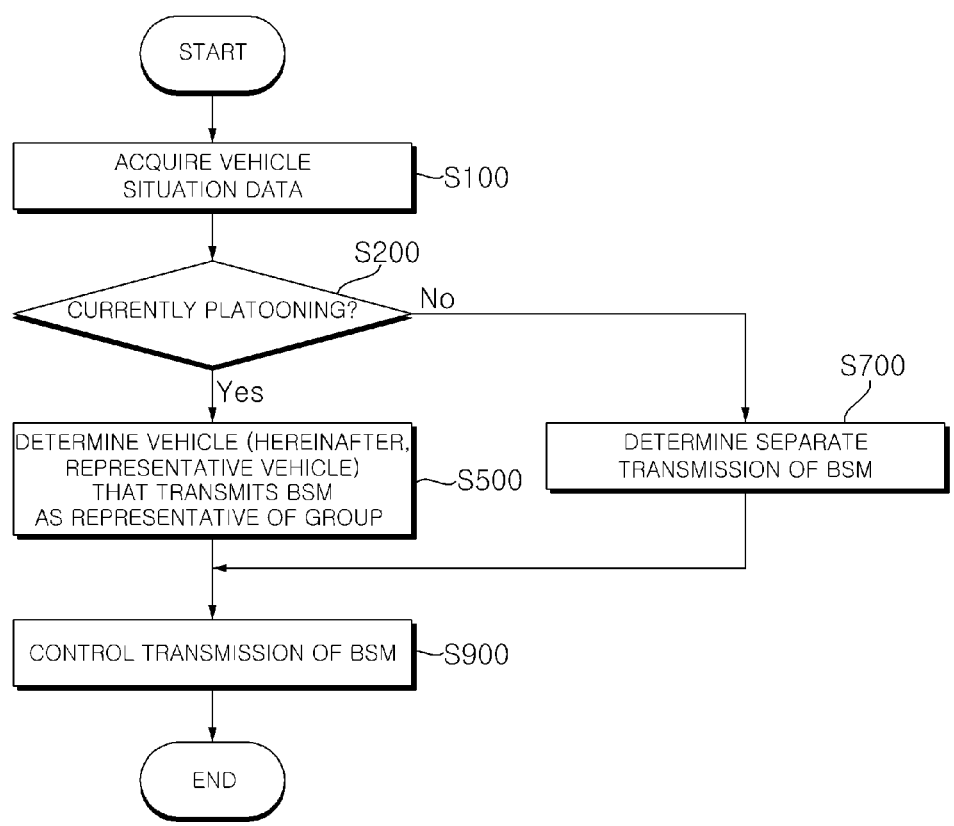
FIG. 5 is a flowchart of a processor according to an embodiment.

FIG. 5 is a flowchart of a processor according to an embodiment.

Referring to FIG. 5, the electronic device 100 may include the processor 170 for acquiring data of a situation of the vehicle 10 and determining whether the vehicle 10 is a platooning vehicle based on the data.

The processor 170 may acquire platooning information of the vehicle as data of a situation of the vehicle 10 from the traveling system 260 through the interface unit 180.

When a plurality of vehicles including the vehicle 10 performs platooning, the platooning information may include information on a platooning zone, a platooning route, a platooning destination, and an expected time when a vehicle arrives at a destination. The platooning information may include information on the number of vehicles in a group, an interval between vehicles, a position of a vehicle, and vehicle speed.

The platooning information may include information on a leader vehicle (LV) and one or more follower vehicles (FV1, FV2, . . . , FVn, hereinafter, referred to as FV when it is not necessary to differentiate them) in vehicles in a group. The leader vehicle (LV) and the follower vehicle (FV) may perform V2V communication through each communication device. The leader vehicle (LV) may control driving of the follower vehicle (FV).

The leader vehicle (LV) may transmit a control signal to the follower vehicle (FV) through the communication device to enable the leader vehicle (LV) and the follower vehicle (FV) to perform platooning. The follower vehicle (FV) may receive the control signal transmitted by the leader vehicle (LV) through the communication device and may perform platooning along with the leader vehicle (LV) based on the received control signal. The follower vehicle (FV) may transmit information on a vehicle position and an operation state to the leader vehicle (LV) through the communication device. The leader vehicle (LV) may receive the information transmitted by the follower vehicle (FV) through the communication device and may detect the vehicle position and the operation state of the follower vehicle (FV) based on the received information.

Upon acquiring the platooning information of the vehicle 10 as the data of the situation of the vehicle 10 from the traveling system 260 through the interface unit 180, the processor 170 may determine whether the vehicle 10 is a platooning vehicle.

Upon determining that the vehicle 10 is a platooning vehicle, the processor 170 may determine any one of vehicles in a group as a vehicle (hereinafter, a representative vehicle (RV)) that transmits a basic safety message (BSM) as a representative of the group.

The BSM may be a message that is transmitted to a nearby vehicle (or other objects adjacent to the group) by the vehicle 10 that performs platooning. That is, other vehicles adjacent to the group may receive the BSM from the group through V2V communication, and thus a driver of other vehicles or an autonomous system may easily ensure a safe distance from the vehicle 10 that performs platooning or the like and may travel, thereby enhancing traveling safety. The BSM may include information on the weight, speed, acceleration, steering wheel rotation angle, brake pedal position, and the like of the vehicle 10 that performs platooning, which are acquired from the sensing unit 270. The BSM may include information on a position of the vehicle 10 that performs platooning, which is acquired from the position data production device 280. The BSM may include information on the size of the vehicle 10 that performs platooning, and here, the size of the vehicle 10 may include the overall length, width, and height of the vehicle 10 as information that is determined at release of the vehicle 10.

The BSM may be information generated by the processor 170. In this case, the processor 170 may acquire information included in the BSM from each of the sensing unit 270 and the position data production device 280 through the interface unit 180. However, in some embodiments, the BSM may also be generated by other electronic devices in the vehicle 10.

When the representative vehicle (RV) transmits the BSM as a representative of the group, the processor 170 may correct and generate the BSM to contain information on the weight, speed, acceleration, steering wheel rotation angle, brake pedal position, position, size, and the like of each vehicle in the group. The processor 170 may correct and generate the BSM to contain information on a platooning zone (i.e., the length and width of the group) and information on a platooning route from the platooning information.

The BSM may be transmitted to a nearby vehicle (or an object adjacent to the group) of the group by the communication device 220 through the interface unit 180 based on the transmission control signal of the processor 170.

Referring to FIG. 5, an operation method of the electronic device 100 may include operation S100 of acquiring data of a situation of the vehicle 10 by at least one processor 170, and operation S200 of determining whether the vehicle 10 is a platooning vehicle based on the data by the at least one processor 170.

The operation method of the electronic device 100 may include operation S500 of determining any one of vehicles in the group as a vehicle (i.e., the representative vehicle (RV)) that transmits the BSM as a representative of the group by the at least one processor 170 upon determining that the vehicle 10 is a platooning vehicle in operation S200.

The operation method of the electronic device 100 may include operation S700 of determining each of vehicles in the group as a vehicle that separately transmits the BSM by the at least one processor 170 upon determining that the vehicle 10 is not a platooning vehicle in operation S200.

The operation method of the electronic device 100 may include operation S900 of generating a transmission control signal of the BSM to transmit the BSM to a nearby vehicle (or an object adjacent to the group) of the group by the at least one processor 170 after the determination operation S500 or the determination operation S700.

In some embodiments, the operation method of the electronic device 100 may include operation S800 of generating the BSM by the at least one processor 170 prior to the generation operation S900, and in this case, the generated BSM may be transmitted to a nearby vehicle (or an object adjacent to the group) by the communication device 220 through the interface unit 180 based on the transmission control signal generated in the generation operation S900.

As described above, in the electronic device 100 and the operation method thereof according to embodiments of the present disclosure, when the vehicle 10 is a platooning vehicle, the representative vehicle (RV) may transmit the BSM as a representative of the group, and thus a computing resource and/or a communication resource of each vehicle in the group may be effectively used, thereby advantageously enhancing the efficiency and safety of a platooning system, compared with a case in which each vehicle in the group separately transmits the BSM.

Figure 6:
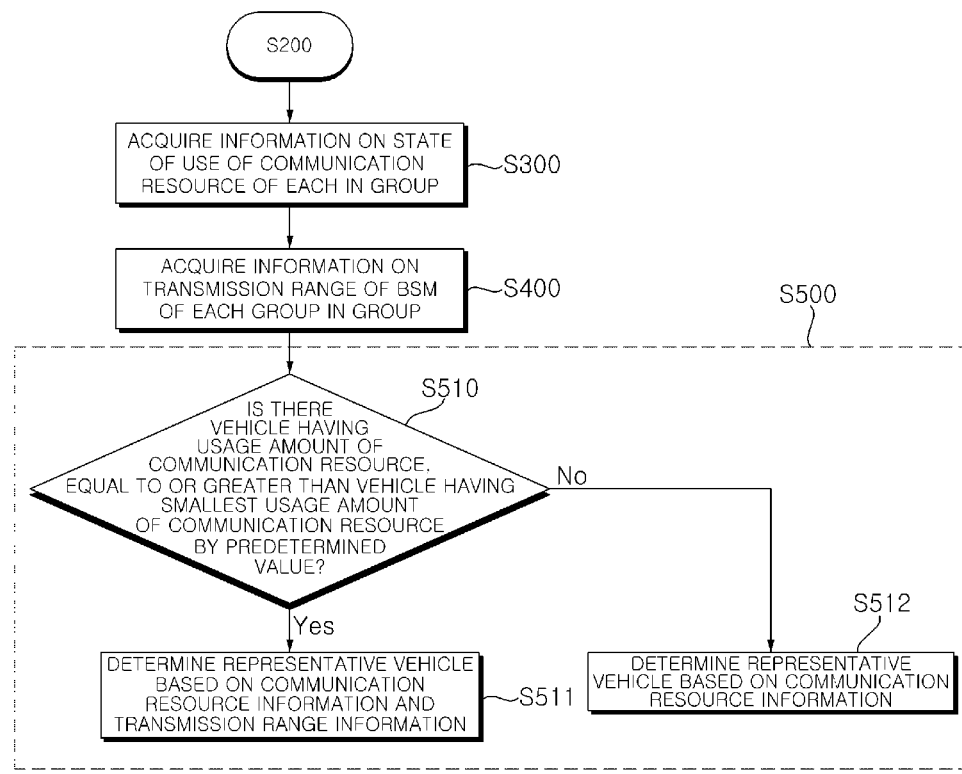
FIG. 6 is a detailed diagram of operation S500 of determining a representative vehicle according to an embodiment.

FIG. 6 is a detailed diagram of operation S500 of determining a representative vehicle according to an embodiment.

Referring to FIG. 6, the processor 170 may determine a vehicle (i.e., a vehicle having the most sufficient communication resources) that uses a smallest amount of communication resources among vehicles in the group as a representative vehicle (RV), based on information on a state of use of a communication resource of each vehicle in the group, which is received via V2V communication.

That is, vehicles in the group are supposed to transmit and receive data via V2V communication between the vehicles for platooning or to sense surrounding data to thus use a large amount of communication resources, and thus like in the present disclosure, when a vehicle that uses a smallest amount of communication resources as a vehicle that transmits a BSM as a representative of the group, communication resources of the vehicle may be conserved and interference between platooning information and the BSM may be reduced to thus advantageously establish a pleasant communication environment, compared with the case in which each vehicle in the group separately transmits the BSM.

In some embodiments, the processor 170 may determine a vehicle (i.e., a vehicle having the most sufficient computing resource and communication resource) that uses a smallest amount of computing resources and communication resources among vehicles in the group as a representative vehicle (RV), based on information on a state of use of a computing resource of each vehicle of the group, which is received via V2V communication, as well as the communication resources.

That is, in a situation in which communication of a large amount of information is supposed to be performed like platooning, a vehicle having the most sufficient computing resource and communication resource may transmit the BSM in consideration of a state of use of computing resources and communication resources of an on board unit (OBU) of the vehicle, thereby advantageously enhancing the efficiency and safety of the platooning system.

Figure 7:
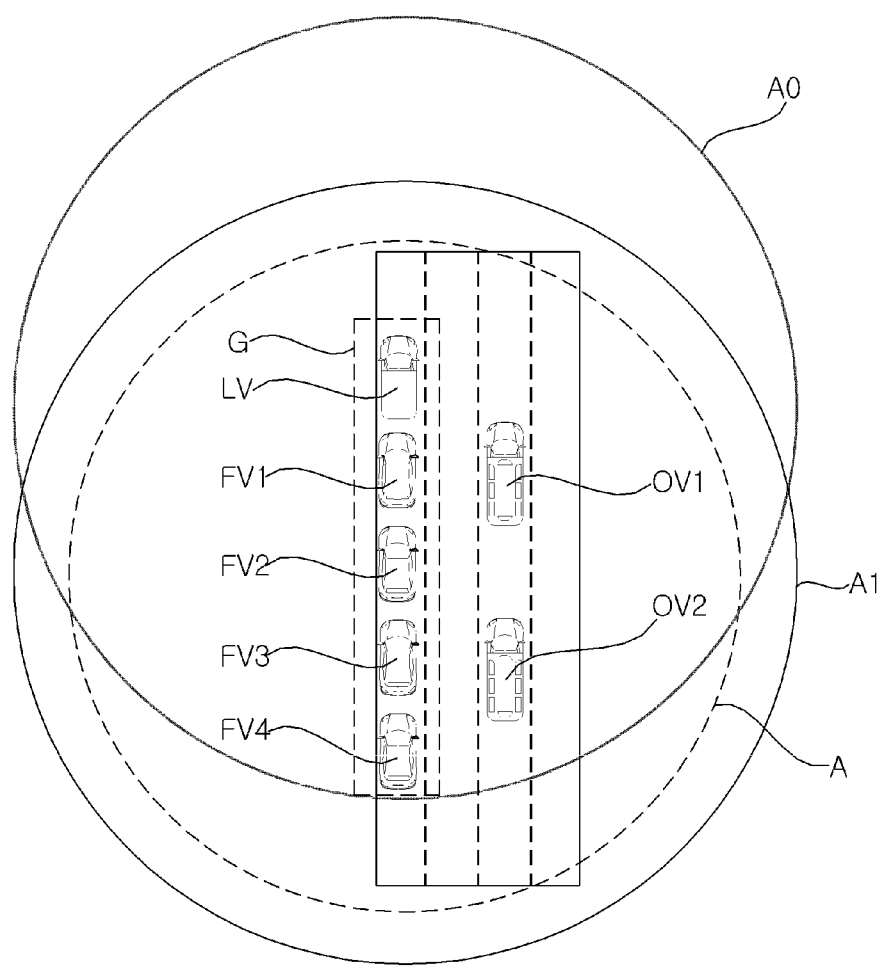
FIG. 7 is a diagram for explanation of determination of a representative vehicle depending on a range of transmission of a basic safety message (BSM) of each vehicle in a group according to an embodiment.

FIG. 7 is a diagram for explanation of determination of a representative vehicle depending on a range of transmission of a BSM of each vehicle in a group according to an embodiment.

Referring to FIG. 7, the processor 170 may determine a vehicle having the widest transmission range of the BSM while including a reference range A formed based on the group among vehicles in the group as the representative vehicle (RV), based on information on the transmission range of the BSM of each vehicle in the group, which is received via V2V communication. Here, the transmission range of the BSM may be a range in which the vehicle 10 transmits the BSM, and the vehicle 10 may transmit the BSM to a nearby vehicle (or other objects that are capable of receiving the BSM) that belongs to the corresponding transmission range.

That is, even if at least one of vehicles in the vehicle is determined as a representative vehicle (RV) in order to effectively use resources, the representative vehicle (RV) may have a sufficient transmission range of the BSM to cover all of the vehicles in the group in consideration of the proper function of the BSM of ensuring safety with other vehicles between platooning vehicles.

For example, when the leader vehicle LV and first to fourth follower vehicles FV1, FV2, FV3, and FV4 form a group G and perform platooning, the reference range A that is formed based on the group may be a range in which points spaced apart from a forward point of the leader vehicle LV positioned at the head and a backward point of the fourth follower vehicle FV4 positioned at the back by a predetermined distance correspond to portions of a circumference.

Because the center of a transmission range A0 of the BSM of the leader vehicle LV is eccentrically positioned towards a forward point of the group G, and particularly, it is difficult to ensure the safety of platooning in terms of a relationship with other vehicles adjacent to the fourth follower vehicle FV4 positioned at a backward point of the group G. In contrast, because the center of a transmission range A2 of the BSM of the second follower vehicle FV2 positioned at the center of the group G is positioned at the center of the group G and the transmission range A2 of the BSM of the second follower vehicle FV2, which is formed by a largest degree among vehicles in the group while including the reference range A, the second follower vehicle FV2 may be considered to have a sufficient transmission range of the BSM to cover all vehicles in the group.

In some embodiments, when there is a vehicle (hereinafter, a second vehicle) having a usage amount of communication resources, which is equal to or greater than that of a vehicle (hereinafter, a first vehicle) having a smallest usage amount of communication resources by a predetermined value among vehicles in the group, the processor 170 may determine a vehicle, a transmission range of the BSM of which is formed based on the center of the group while including the reference range A formed based on the group among the first and second vehicles, as the representative vehicle (RV). Here, the second vehicle may also be present in a plural number.

That is, a representative vehicle (RV) candidate group may be preferentially selected in consideration of a usage amount of communication resources, and then the representative vehicle (RV) may be lastly determined in consideration of a transmission range of the BSM, thereby effectively using of resources and ensuring the safety with other vehicles in the group.

Referring to FIGS. 6 and 7, the operation method of the electronic device 100 may include operation S300 of acquiring information on a state of use of a communication resource of each vehicle in the group, which is received via V2V communication by the at least one processor 170 (S300) and operation S400 of acquiring information on a transmission range of the BSM of each vehicle in the group, which is received via V2V communication, by the at least one processor 170.

In this case, the determination operation S500 may include, after the acquisition operations S300 and S400, operation S510 of determining whether there is a vehicle (hereinafter, a second vehicle) having a usage amount of communication resources, which is equal to or greater than that of a vehicle (hereinafter, a first vehicle) having a smallest usage amount of communication resources by a predetermined value among vehicles in the group, by the at least one processor 170.

In addition, the determination operation S500 may include operation S512 of determining the first vehicle as a representative vehicle (RV) upon determining that there is no second vehicle in operation S510. In the determination operation S500, a vehicle, the transmission range of which is formed based on the center of the group while including the reference range formed based on the group among the first and second vehicles, as the representative vehicle (RV) upon determining that there is the second vehicle in the determination operation S510.

Figure 8:
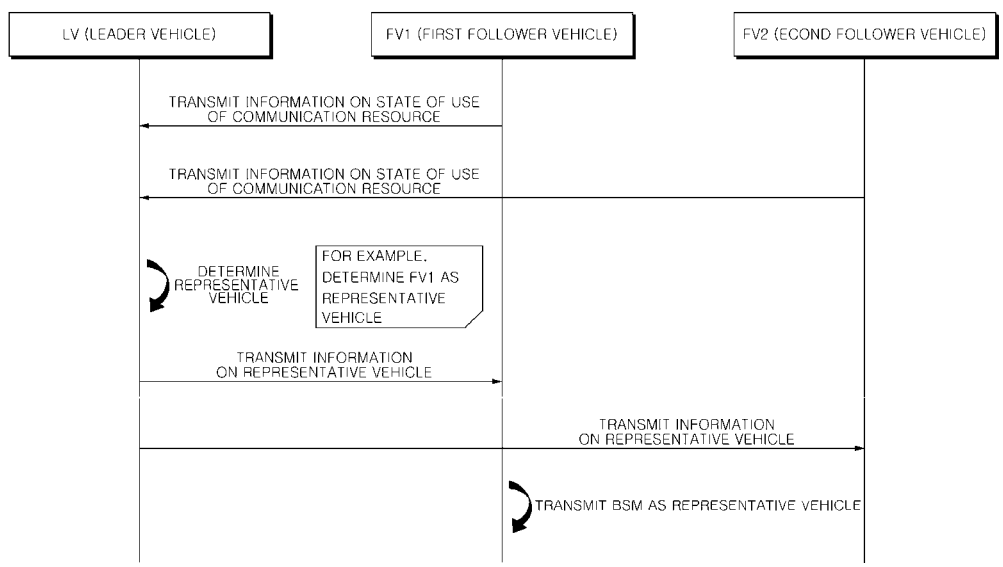
FIG. 8 illustrates an example of determination of a representative vehicle according to an embodiment.

FIG. 8 illustrates an example of determination of a representative vehicle according to an embodiment.

Referring to FIG. 8, the leader vehicle LV may receive information on a state of use of a communication resource from the follower vehicle FV and may perform control of determining the representative vehicle (RV) based on the received information. However, the present disclosure is not limited thereto and at least one of vehicles in the group G may also perform control.

In more detail, when the leader vehicle LV and the first and second follower vehicles FV1 and FV2 form the group G and perform platooning, the leader vehicle LV may receive information on a state of use of a communication resource from each of the first and second follower vehicles FV1 and FV2. The leader vehicle LV may collect the information on a state of use of a communication resource, which is received from each of the first and second follower vehicles FV1 and FV2, along with information on a state of use of a communication resource of the leader vehicle LV, and may determine a vehicle (e.g., the first follower vehicle FV1) having a smallest usage amount of a communication resource as the representative vehicle (RV).

Then, the leader vehicle LV may transmit information on the representative vehicle (RV) to each of the first and second follower vehicles FV1 and FV2. Here, the information on the representative vehicle (RV) may include information indicating that the first follower vehicle FV1 as the representative vehicle (RV) transmits the BSM and the leader vehicle LV and the second follower vehicle FV2 do not separately transmit a BSM. As a result, the first follower vehicle FV1 as the representative vehicle (RV) may transmit the BSM.

Such an algorithm for transmitting and receiving information for determining a representative vehicle (RV) between vehicles in the group G may also be applied to the case in which the representative vehicle (RV) is determined based on the information that is described above or below, the representative vehicle (RV) is determined again when a specific situation is generated, or each vehicle in the group separately transmits the BSM as well as the above case in which the representative vehicle (RV) is determined based on a state of use of the communication resource.

Figure 9:
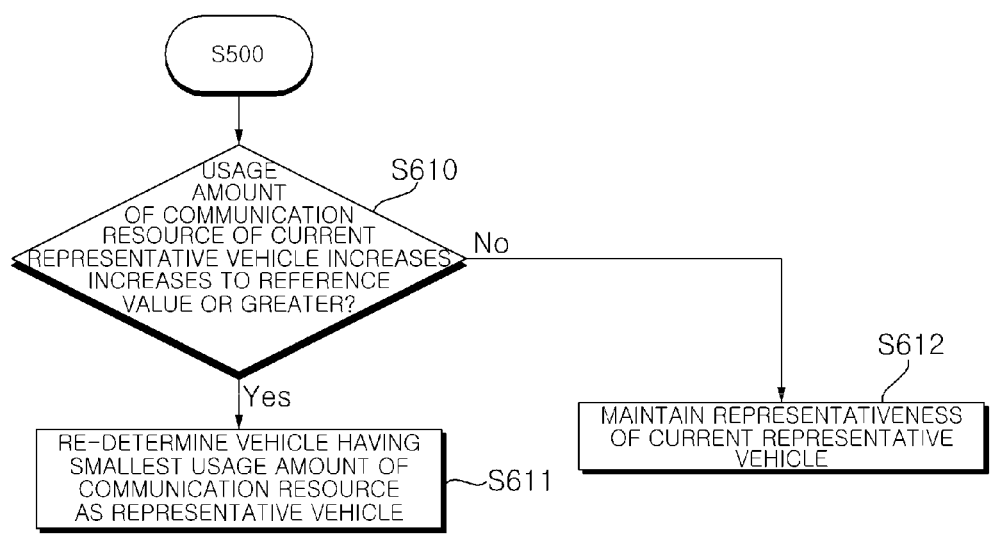
FIGS. 9 and 10 are detailed diagrams of operation S600 of changing the representativeness of a representative vehicle according to an embodiment and illustrate change in a representative vehicle when a usage amount of communication resources of the representative vehicle increases to a reference value or greater.
Figure 10:
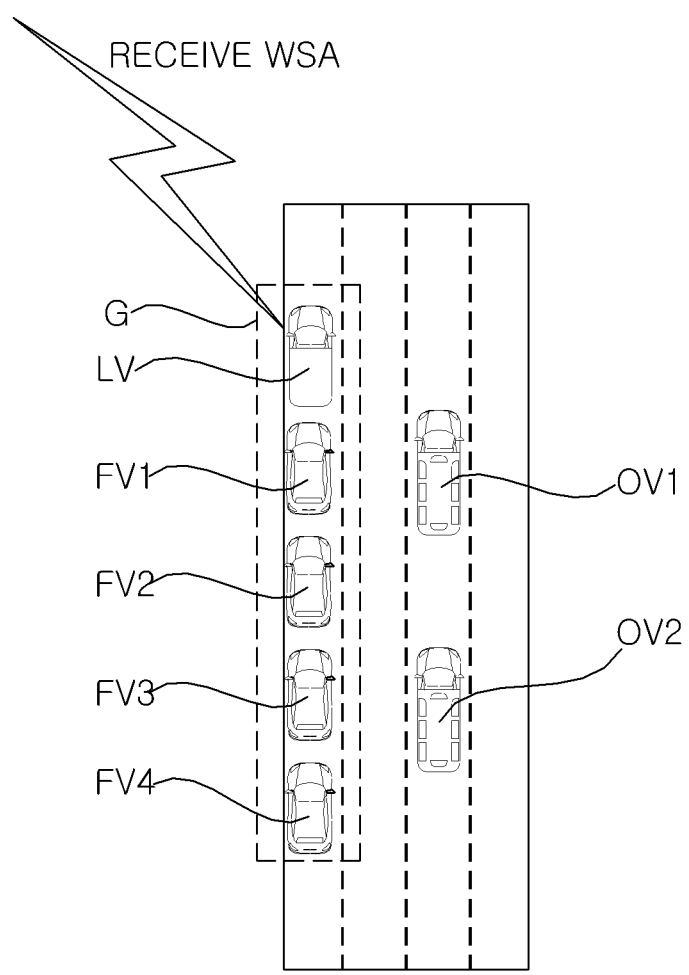

FIGS. 9 and 10 are detailed diagrams of operation S600 of changing the representativeness of a representative vehicle according to an embodiment and illustrate change in a representative vehicle when a usage amount of communication resources of the representative vehicle increases to a reference value or greater.

Referring to FIG. 9, upon determining that the usage amount of the communication resource of a vehicle (hereinafter, a current representative vehicle) determined as the representative vehicle (RV) among vehicles in the group increases to the reference value or greater, the processor 170 may re-determine a vehicle having a smallest usage amount of the communication resource as the representative vehicle (RV) except for the current representative vehicle among vehicles in the group.

That is, when the current representative vehicle receives a large amount of information from the outside during platooning and determines that the usage amount of the communication resource increases to the reference value or grater, the current representative vehicle may have difficulty in transmitting the BSM as a representative of the group, and thus the representativeness of the current representative vehicle may be handed over to a vehicle having a smallest usage amount of communication resources among vehicles in the group in order to ensure the safety of a platooning system.

For example, referring to FIG. 10, the leader vehicle LV and the first to fourth follower vehicles FV1, FV2, FV3, and FV4 form the group G and perform platooning, and in this regard, when the leader vehicle LV as the current representative vehicle receives a large amount of information such as a wave service advertisement (WSA) from an external server or a cloud while transmitting the BSM as a representative of the group G, the processor 170 may re-determine a vehicle (e.g., the second follower vehicle FV2) having a smallest usage amount of the communication resources as the representative vehicle (RV) except for the leader vehicle LV among vehicles in the group, and thus the second follower vehicle FV2 may transmit the BSM as a representative of the group G.

Referring to FIGS. 9 and 10, the operation method of the electronic device 100 may include, after the determination operation S500, operation S610 of determining whether the usage amount of the communication resources of a vehicle (hereinafter, a current representative vehicle) determined as the representative vehicle (RV) increases to the reference value or greater, by the at least one processor 170.

In addition, the operation method of the electronic device 100 may include operation S612 of maintaining the current representative vehicle as the representative vehicle (RV) (i.e., representativeness is maintained) by the at least one processor 170 upon determining that the usage amount does not increase to the reference value or greater in the determination operation S610. The operation method of the electronic device 100 may include operation S611 of re-determining that the vehicle having the smallest amount of communication resources as the representative vehicle (RV) except for the current representative vehicle among vehicles in the group upon determining the usage amount increases to the reference value or greater in the determination operation (S610).

Figure 11:
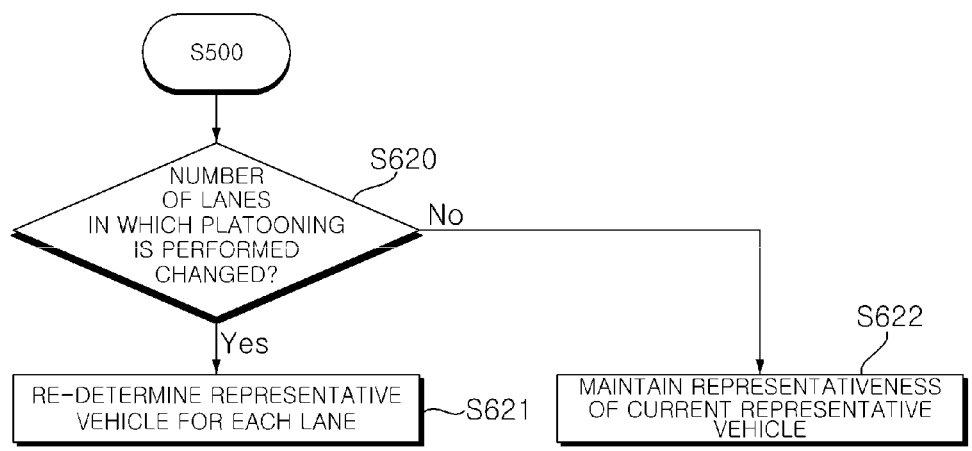
FIGS. 11 and 12 are detailed diagrams of operation S600 of changing the representativeness of the representative vehicle according to an embodiment and illustrate change in a representative vehicle when the number of lanes in which platooning is performed is changed.
Figure 12:
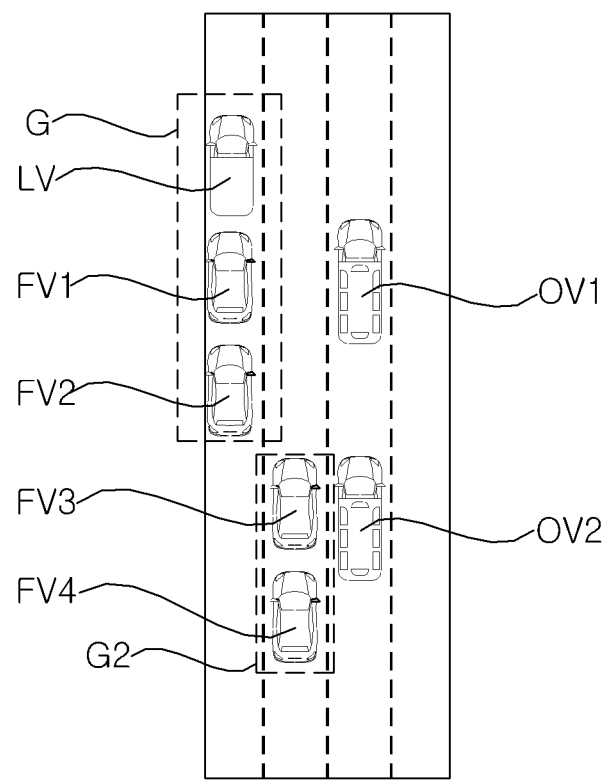

FIGS. 11 and 12 are detailed diagrams of operation S600 of changing the representativeness of the representative vehicle according to an embodiment and illustrate change in a representative vehicle when the number of lanes in which platooning is performed is changed.

Referring to FIG. 11, the processor 170 may re-determine a representative vehicle (RV) for each lane upon determining that a line of the group is changed along with change (that is, increase or decrease) in the number of lanes in which platooning is performed.

That is, even if the number of lanes in which platooning is performed increases, it is disadvantageous that the current representative vehicle transmits the BSM as a representative of the group in terms of ensuring of the safety platooning, and thus it is required to re-determine the representative vehicle (RV). In more detail, when a plurality of lines of the group are present along with increase in lanes in which platooning is performed, the representative vehicle (RV) that transmits the BSM as a representative of a line for each line of the group may be re-determined. In this case, the above algorithm in consideration of a resource and a transmission range may also be applied to an algorithm for re-determining the representative vehicle (RV).

Even if the number of lanes in which platooning is performed decreases, it may be disadvantageous that the current representative vehicle transmits the BSM as a representative of the group in terms of efficiency of a platooning system, and thus it is required to re-determine the representative vehicle (RV). In more detail, when a single line of the group is present along with reduction in the number of lanes in which platooning is performed, one representative vehicle (RV) that transmits the BSM as a representative of the single line of the group may be re-determined.

For example, referring to FIG. 12, the leader vehicle LV and the first to fourth follower vehicles FV1, FV2, FV3, and FV4 form the group G and perform platooning, and in this regard, when the third and fourth follower vehicles FV3 and FV4 change a lane and thus the number of lanes in which platooning is performed increases to 2 from 1 while the leader vehicle LV as current representative vehicle transmits the BSM as a representative of the group G, the representative vehicle (RV) that transmits the BSM as a representative of each line may be re-determined as the leader vehicle LV and the third follower vehicle FV3 in a first group line G1 and a second group line G2, respectively, and thus the leader vehicle LV may transmit the BSM as a representative of the first group line G1 and the third follower vehicle FV3 may transmit the BSM as a representative of the second group line G2 to thus continuously ensure platooning safety.

Referring to FIGS. 11 and 12, the operation method of the electronic device 100 may include, after the determination operation S500, operation S620 of determining whether a line of the group is changed as the number of lanes in which platooning is performed, by the at least one processor 170.

The operation method of the electronic device 100 may include operation S622 of maintaining the current representative vehicle as the representative vehicle (RV) (i.e., representativeness is maintained) by the at least one processor 170 upon determining that the line of the group is not changed in the determination operation S620. The operation method of the electronic device 100 may include operation S621 of re-determining the representative vehicle (RV) for each line of the group upon determining that the line of the group is changed in the determination operation S620.

Figure 13:
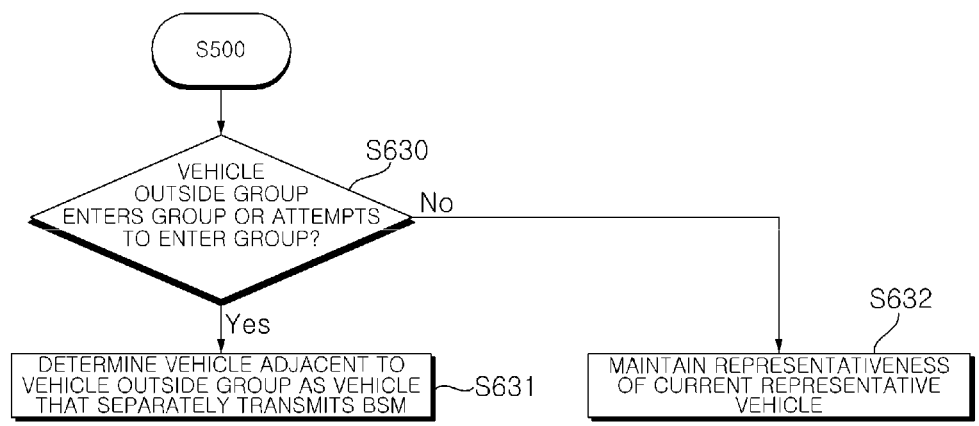

FIGS. 13 and 14 are detailed diagrams of operation S600 of changing the representativeness of a representative vehicle according to an embodiment and illustrate separate transmission of a BSM in a group when a vehicle outside the group enter the group or attempts to enter the group.

Referring to FIG. 13, upon determining that a line of the group is changed as a vehicle outside a group enters the group, the processor 170 may determine a vehicle adjacent to the vehicle outside the group as a vehicle that separately transmits the BSM among vehicles in the group.

Upon determining that the vehicle outside the group attempts to enter the group, the processor 170 may determine the vehicle (hereinafter, an adjacent vehicle) adjacent to the vehicle outside the group as a vehicle that separately transmits the BSM among the vehicles in the group.

That is, when the vehicle outside the group enters the group or attempts to enter the group during platooning, the safety of platooning is more required than efficient use of the resource, and thus the adjacent vehicle may be controlled to separately transmit the BSM to accurately transmit information such as a current position and speed of the adjacent vehicle to the vehicle outside the group.

For example, referring to FIGS. 14A and 14B, the leader vehicle LV and the first to fourth follower vehicles FV1, FV2, FV3, and FV4 form the group G and perform platooning, and in this regard, when a vehicle OV1 other than a group attempts to enter the group G (refer to FIG. 14A) or already enters the group G (i.e., thus, a line of a group is changed) (refer to FIG. 14B) while the leader vehicle LV as the current representative vehicle transmits the BSM as a representative of the group G, each of the first and second follower vehicles FV1 and FV2 adjacent to the vehicle OV1 outside the group may be controlled to separately transmit the BSM.

Referring to FIGS. 13 to 14B, the operation method of the electronic device 100 may include, after the determination operation S500, operation S630 of determining whether a vehicle outside the group enters the group or attempts to enter the group by the at least one processor 170.

The operation method of the electronic device 100 may include operation S632 of maintaining the current representative vehicle as the representative vehicle (RV) (i.e., representativeness is maintained) by the at least one processor 170 upon determining that the vehicle outside the group enters the group or attempts to enter the group in the determination operation S630. Here, when the representativeness of the current representative vehicle is maintained, this means that only the current representative vehicle continuously transmits the BSM. The operation method of the electronic device 100 may include operation S631 of determining a vehicle adjacent to the vehicle outside the group as a vehicle that separately transmits the BSM among vehicles in the group by the at least one processor 170 upon determining that the vehicle outside the group enters the group or attempts to enter the group in the determination operation S630. In this case, the current representative vehicle may be capable of transmitting the BSM as a representative of the group, but the adjacent vehicle as well as the current representative vehicle may also be capable of transmitting the BSM, and thus the representativeness of the current representative vehicle may be weakened.

Figure 16:
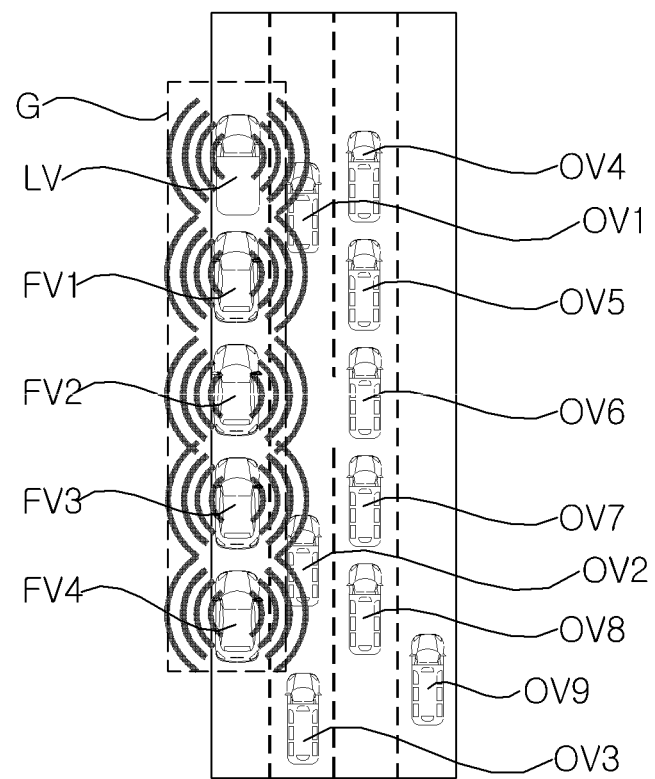

FIGS. 15 and 16 are detailed diagrams of operation S600 of changing the representativeness of a representative vehicle according to an embodiment and illustrate separate transmission of a BSM of a vehicle in a group when a plurality of vehicles in the group approaches the group.

Referring to FIG. 15, upon determining that a ratio of the number of vehicles outside the group positioned within a preset distance from the group to the number of vehicles in the group is equal to or greater than a preset ratio (hereinafter, when a plurality of vehicles outside the group approaches the group), the processor 170 may determine each vehicle in the group as a vehicle that separately transmits the BSM.

That is, when the plurality of vehicles outside the group approaches the group, danger of safety accidents between a vehicle in the group and a vehicle outside the group may be increased and it is more required to ensure the safety of platooning than effective use of the resource, and thus each vehicle in the group may be controlled to separately transmit the BSM to more accurately transmit information such as the current position and speed of each vehicle in the group to a vehicle outside the group.

In some embodiments, when a plurality of vehicles outside the group approaches the group, the processor 170 may stop transmission of the BSM by the current representative vehicle as a representative of the group. Thus, the current representative vehicle may be prevented from redundantly transmitting the BSM as a representative of the group while separately transmitting the BSM, thereby saving resources.

For example, referring to FIG. 16, the leader vehicle LV and the first to fourth follower vehicles FV1, FV2, FV3, and FV4 form the group G and perform platooning, and in this regard, when a plurality of vehicles OV1 to OV8 other than the group approaches the group while the leader vehicle LV as the current representative vehicle transmits the BSM as a representative of the group G, each vehicle in the group may separately transmits the BSM and the leader vehicle LV may be controlled to stop transmitting the BSM as a representative of the BSM.

Referring to FIGS. 15 and 16, the operation method of the electronic device 100 may include, after the determination operation S500, operation S640 of determining whether a ratio of the number of vehicles outside the group positioned within a preset distance from the group to the number of vehicles in the group is equal to or greater than a preset ratio (hereinafter, when a plurality of vehicles outside the group approaches the group) by the at least one processor 170.

The operation method of the electronic device 100 may include operation S642 of maintaining the current representative vehicle as the representative vehicle (RV) (i.e., representativeness is maintained) by the at least one processor 170 upon determining that a plurality of vehicles outside the group does not approach the group in the determination operation S640. The operation method of the electronic device 100 may include operation S641 of determining each vehicle in the group as a vehicle that separately transmits the BSM by the at least one processor 170 upon determining that the plurality of vehicles outside the group approaches the group in the determination operation S640, and in some embodiments, may further include an operation of stopping transmission of the BSM by the current representative vehicle as a representative of the group, by the at least one processor 170.

The disclosure can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present disclosure without departing from the spirit or scope of the disclosure.

Thus, it is intended that the present disclosure cover the modifications and variations of the disclosure provided they come within the scope of the appended claims and their equivalents.

According to the above technical solution, the present disclosure may provide one or more of the following effects.

First, any one of vehicles in a group may transmit a basic safety message (BSM) as a representative of the group among vehicles in the group to thus effectively use a resource of each vehicle in the group, thereby enhancing the efficiency and safety of a platooning system.

Second, even if a vehicle that transmits a BSM as a representative of the group is already determined, the vehicle that transmits the BSM as the representative of the group is changed when a specific situation occurs during platooning or each vehicle in the group may separately transmit the BSM, thereby organically responding to a situation that occurs during platooning.

What is claimed is:

1. An operation method of a vehicular electronic device, the method comprising:
   acquiring information on a state of use of a communication resource of each vehicle in a group of vehicles that are platooning, via vehicle to vehicle (V2V) communication using a communication device by at least one processor; and
   acquiring information on a transmission range of a basic safety message (BSM) of each vehicle in the group, via V2V communication using the communication device by the at least one processor,
   determining, by the at least one processor, a first vehicle having a smallest usage amount of the communication resource among the vehicles in the group;
   determining, by the at least one processor, whether the vehicles in the group include a second vehicle having a usage amount of the communication resource that is equal to or greater than the usage amount of the communication resource of the first vehicle by a specific value;
   based on lack of the second vehicle in the group, controlling, by the at least one processor, the first vehicle to transmit a BSM as a representative of the group;
   based on the vehicles in the group including the second vehicle, determining, by the at least one processor, a widest transmission range from the acquired information on the transmission range of the BSM of each vehicle, the widest transmission range including a reference range determined based on the transmission ranges of the BSM of the first and second vehicles; and
   based on the vehicles in the group including the second vehicle, controlling, by the at least one processor, a vehicle in the group having the widest transmission range of the BSM to transmit the BSM as a representative of the group.

2. The method of claim 1, further comprising:
   identifying, by the at least one processor, a current representative vehicle that transmits the BSM as the representative of the group;
   determining, by the at least one processor, a usage amount of the current representative vehicle based on the acquired information on the state of use of the communication resource; and
   based on the usage amount of the current representative vehicle increasing to a reference value or greater, controlling, by the at least one processor, a vehicle having a smallest usage amount of the communication resource to transmit the BSM as the representative of the group except for the current representative vehicle among the vehicles in the group.

3. The method of claim 1, further comprising:
   based on a line of the group being changed along with a change in a number of lanes in which platooning is performed, controlling a specific vehicle for each line of the group to transmit the BSM as a representative of each line of the group; and
   based on a line of the group being changed as a vehicle outside the group enters the group, controlling, by the at least one processor, a vehicle of the group adjacent to the vehicle outside the group to separately transmit the BSM.

4. The method of claim 1, further comprising:
   based on a vehicle outside the group attempting to enter the group, controlling, by the at least one processor, a vehicle of the group adjacent to the vehicle outside the group to separately transmit the BSM; and
   based on a plurality of vehicles outside the group approaching the group, where a ratio of a number of vehicles among the plurality of vehicles outside the group positioned within a preset distance from the group to a number of the vehicles in the group is equal to or greater than a preset ratio, controlling, by the at least one processor, each vehicle in the group to separately transmit the BSM.

5. The method of claim 4, further comprising:
   based on the plurality of vehicles outside the group approaching the group, controlling the vehicle transmitting the BSM to stop transmission of the BSM as the representative of the group.

* * * * *